United States Patent Office 3,214,371
Patented Oct. 26, 1965

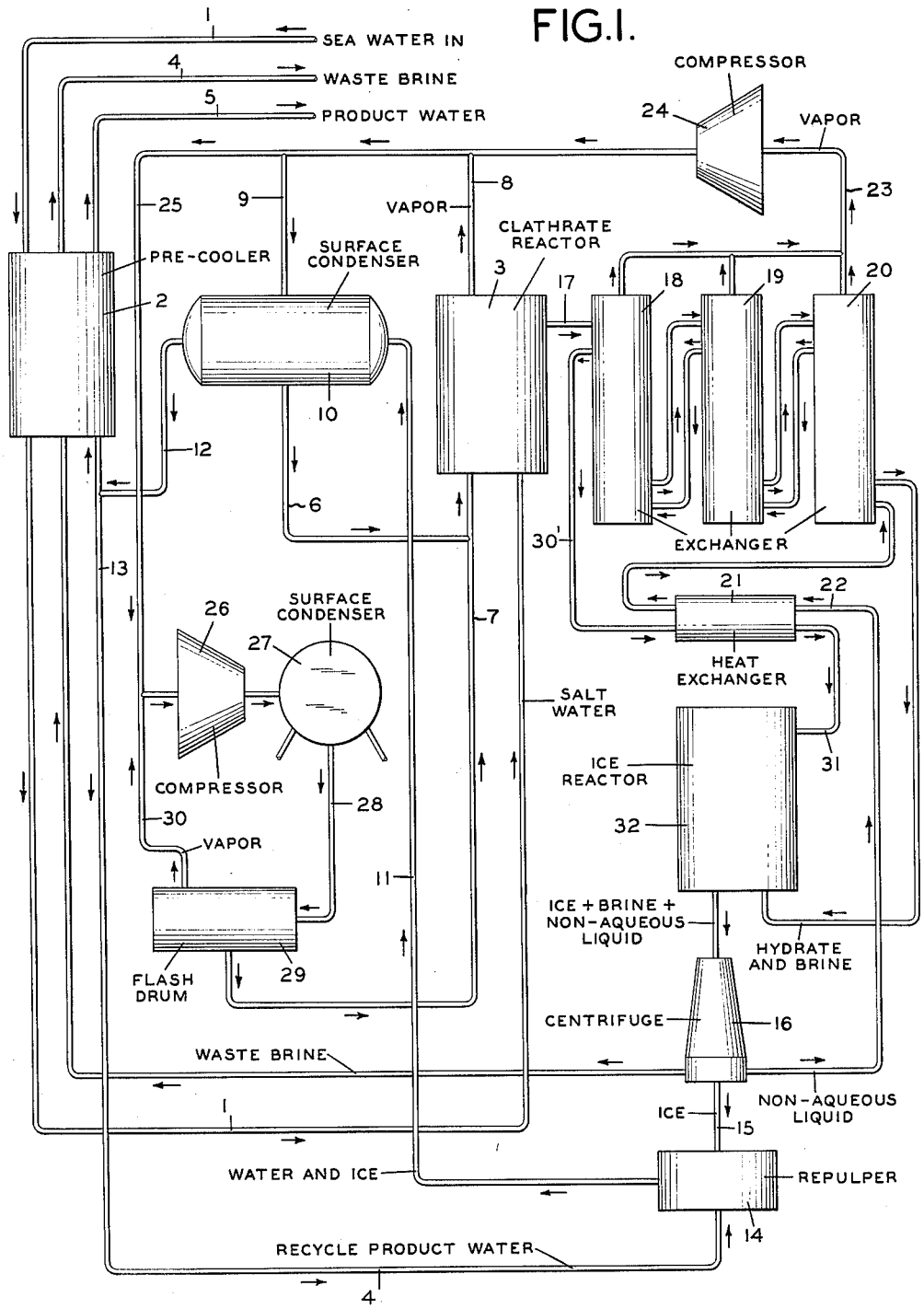

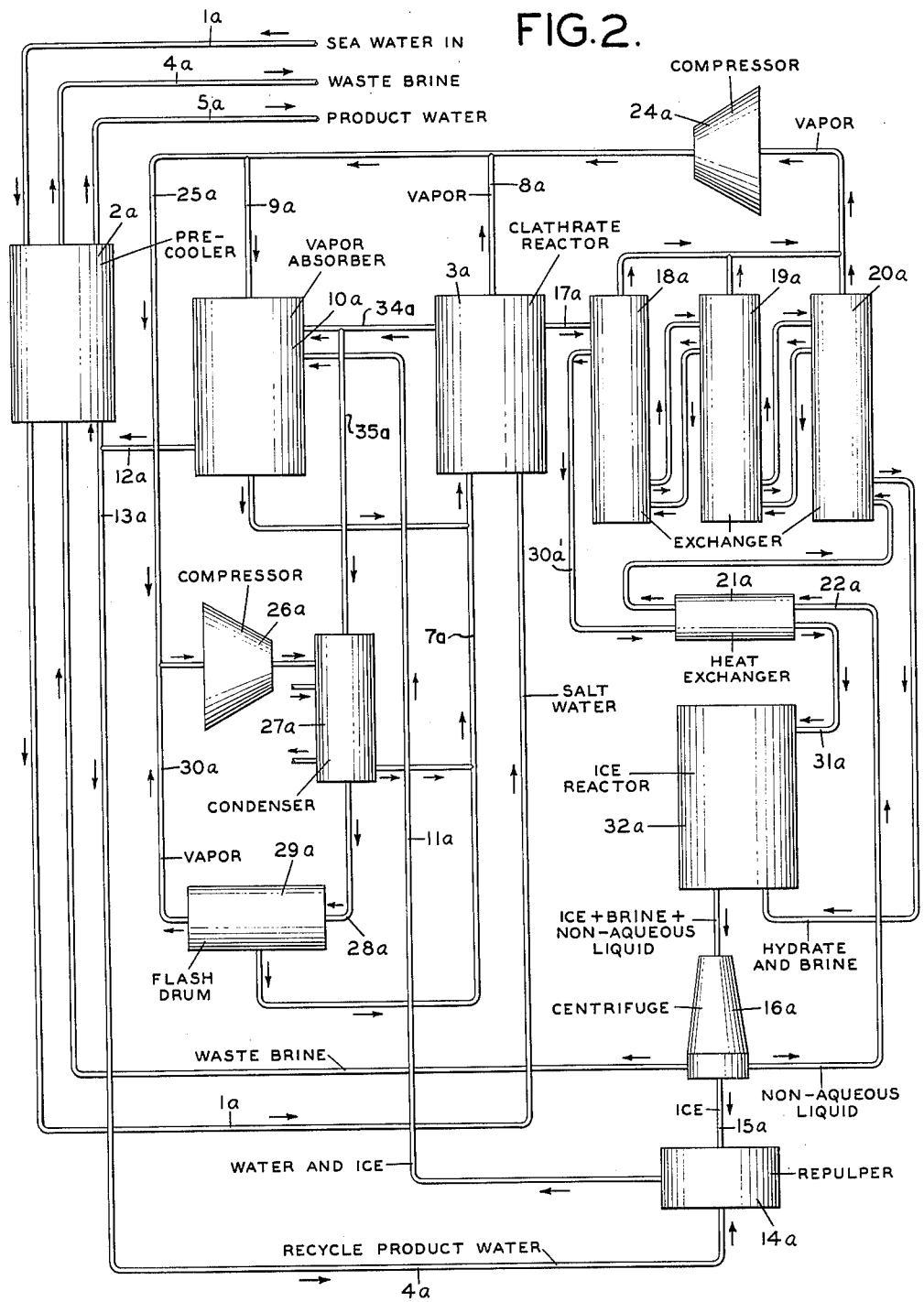

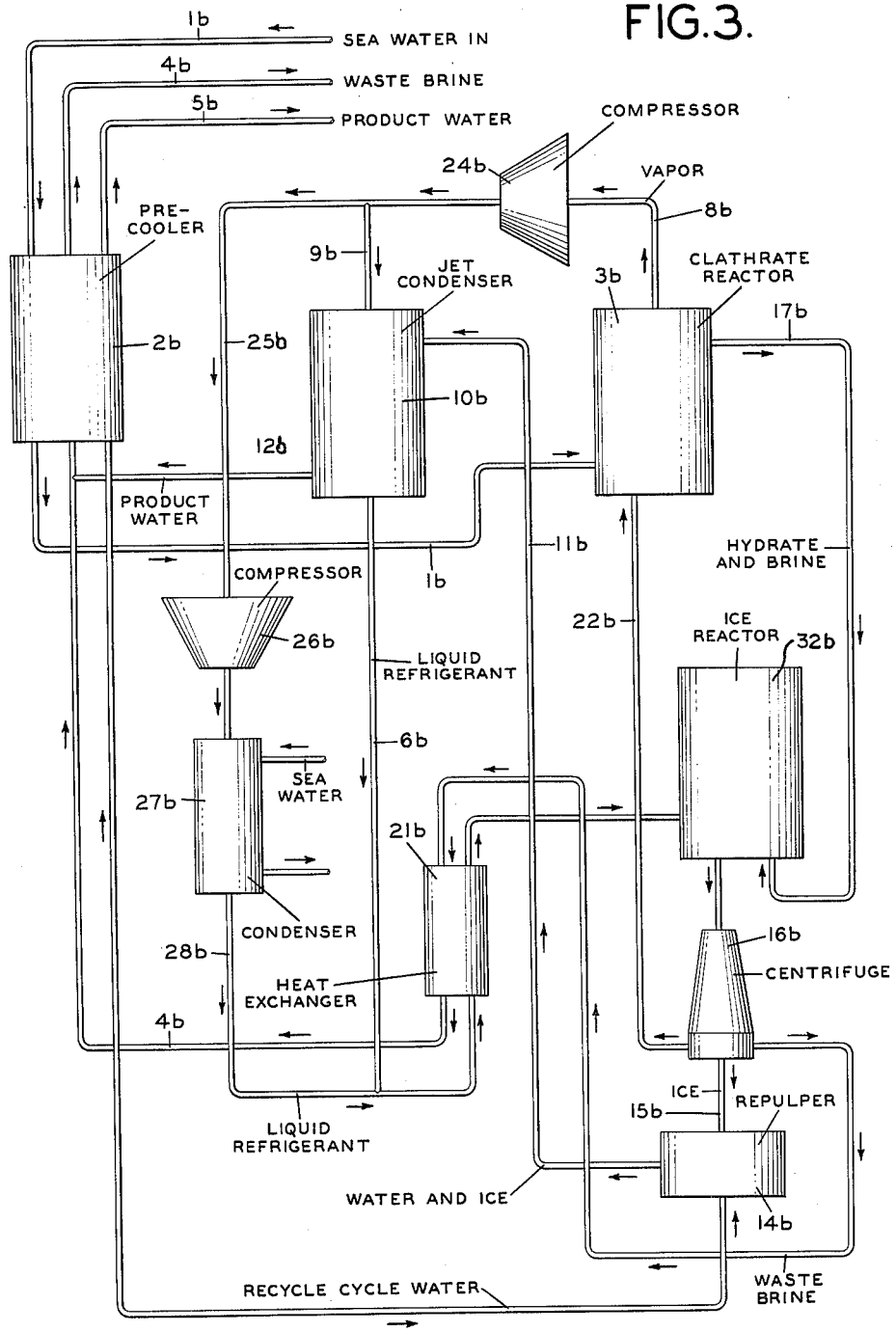

3,214,371
DESALINATION BY FREEZING
Sidney B. Tuwiner, 8 Lincoln Ave., Baldwin, N.Y.
Filed May 9, 1962, Ser. No. 193,635
12 Claims. (Cl. 210—60)

This invention relates to a method for forming ice crystals from aqueous solutions and more particularly to the formation and separation of said ice crystals for the purpose of obtaining potable water or water of reduced solute content; or for the purpose of concentrating a solute or solutes.

In a copending application, S.N. 130,950, I disclose a process which employs both freezing and hydrate techniques whereby the separation of solids from the enriched solution may be more easily accomplished and whereby the energy to accomplish the separation is minimized. In said application I teach a method wherein ice crystals are produced in a magma while concurrently a hydrate dissolves while liberating vapor of the hydrate-forming substance, e.g. propane. This invention as claimed in my copending application utilizes the teaching contained in U.S. Patent 2,577,326 which claims a method for converting a substance, e.g. zinc sulfate, from one hydrate form to another.

A two component system which contains four phases in equilibrium is invariant, i.e., pressure and temperature are uniquely determined. S.N. 130,950 and U.S. Patent 2,577,326 hereinbefore noted each claim a method of obtaining large crystals of a hydrate (or ice) by a controlled transformation within such a system at an invariant point. The phases in equilibrium include two solid hydrate, or ice, phases, the liquid solution and the vapor. A controlled change in the total enthalpy of the system as, e.g., by the withdrawal of heat, as by indirect cooling in U.S. Patent 2,577,326 or by the controlled release of vapor in S.N. 130,950, whereby a clathrate such as propane hydrate is converted into ice and propane vapor enables the transformation of one hydrate form to another.

By such means it is possible to produce well-formed crystals of ice of a size, e.g., 16 mesh, substantially larger than has been possible from the teachings of the prior art.

In referring heretobefore to a two component system I am aware that in the transformation of zinc sulfate from one hydrate form to another as claimed in U.S. Patent 2,577,326 there may be present in solution impurities or other substances. Also in the transformation of propane hydrate to ice there may be sodium chloride and other substances in solution. However, these do not change greatly in concentration during the transformation albeit they may alter the temperature and pressure at the invariant point. The system may be considered therefore to approximate a two component system insofar as the solid phase transformation is concerned.

Propane hydrate and ice are both considerably less dense than the brine obtained in concentration of sea water. To produce large ice crystals free of occulsions it is necessary to provide agitation to maintain a homogeneous suspension of the growing ice crystals in a magma. The difficulty is compounded in the method disclosed in my copending application, S.N. 130,950, by the generation of propane vapor within said magma. This tends to lift the crystals and impede the downward circulation which is necessary to maintain a homogeneous suspension of solids.

It is an object of this invention to provide a means whereby a water clathrate, e.g. propane hydrate, may be converted to well-formed, large crystals of ice. It is further an object to accomplish this without, or with a minimum of, vapor formation.

Having obtained a magma of hydrate crystals in brine and having transformed said hydrate-brine magma of ice crystals in brine, and having separated said ice crystals from said brine and from the hydrate-forming substance, e.g., propane, it is desirable to melt said ice crystals while utilizing their latent heat-absorbing capacity. It is an object of this invention to utilize said latent heat-absorbing capacity for promoting the formation of hydrate from brine and liquid hydrate-forming substance, e.g., propane. This requires the transfer of heat from a vessel in which the hydrate is formed to one in which ice is melted. It is an object of this invention to achieve the aforementioned transfer of heat by a liquid hydrocarbon or similar organic liquid medium without the necessity of employing shell and tube heat exchange means or alternatively to achieve the aforementioned transfer by evaporation of refrigerant, e.g., butene, and condensation of vapor from said evaporation in a surface condenser employing the latent heat absorbing capacity of said ice crystals.

In one embodiment of this invention a hydrate-forming substance is selected which with the concentrated brine, hydrate and ice, constitutes a system having an invariant temperature higher than 32° F. Suitable hydrate-forming substances may, for example, be propane, methyl bromide, monochloromonofluoromethane, monochlorodifluoroethane, dichloromonofluoromethane and difluoroethane. The transfer of heat liberated in hydrate formation to the melting ice is then possible by spontaneous flow across a heat transfer surface or via a hydrocarbon-type medium or by evaporation and condensation of a refrigerant.

In my preferred method of converting a hydrate-in-brine to an ice-in-brine magma I introduce into the hydrate-in-brine magma by agitation a liquid organic substance largely water-immiscible and capable of dissolving the non-aqueous component of the hydrate. A suitable liquid organic substance for that purpose is a hydrocarbon, such as a straight run gasoline, n-butane, butene-1 and butadiene or a halogenated hydrocarbon, such as monochlorotrifluoroethylene. For the sake of conciseness, unless otherwise indicated, when reference is made to "hydrocarbon," this is intended to mean not only hydrocarbon but also halogenated hydrocarbon or any suitable liquid organic hydrate-dissolving, water-immiscible substance.

By introducing the liquid organic hydrate-dissolving substance into the hydrate-in-brine magma, the hydrate-forming substance is extracted from solution in the brine. This disturbs the equilibrium between the hydrate crystals and said brine causing a dissolution of said hydrate crystals with absorption of heat, said heat being liberated in the formation of ice crystals.

Although these reactions are herein described as though they occur consecutively it will be understood that they occur in fact concurrently, the hydrate-forming substance being transferred from the hydrate to the heavier hydrocarbon medium, typically straight run gasoline n-butane or other organic liquid hydrate-dissolving, water-immiscible substance employed. The latent heat of fusion of most clathrates is approximately the same per unit of water content as the latent heat of fusion of ice. Neglecting the differences and the minor effects of sensible heat changes which may accompany the transformation, a pound of ice is produced for each pound of water in the hydrate and, in the case of the propane hydrate system, 0.15 pound of propane are transferred from said hydrate crystals to said hydrocarbon solution. It will be understood that in the transformation I maintain a pressure upon the containing vessel which is at least equal to the vapor pressure of the hydrate-forming substance at the invariant point of the transformation.

I control the volume of said hydrocarbon such as straight run gasoline which enters into said containing vessel so that said hydrate-forming substance possesses a vapor pressure in said solution approximately equal to the decomposition vapor pressure of said hydrate at the invariant temperature.

The magma which leaves the reaction vessel in which I cause the beforementioned transformation to occur contains three phases, to wit: brine, hydrocarbon solution and ice crystals. I separate these by an appropriate method as by screening, centrifugation and/or gravity separation.

The hydrocarbon solution containing the hydrate-forming substance in solution is, as I have discovered, well suited to the cooling of the brine to the temperature for reaction with liquid hydrate-forming substance, said reaction resulting in formation of a magma of hydrate in brine.

A preferred embodiment of my invention will now be further described by reference to the accompanying drawing, FIGURE 1, which illustrates a flow diagram setting forth the processing steps for demineralizing saline water in accordance with my invention.

Sea water in line 1 passes through precooler 2 prior to entering the clathrate reactor 3. In precooler 2 heat in the incoming water is transfered to the stream 4 which consists of waste brine and 5 which consists of product water. This exchange is employed in all processes for saline water recovery by freezing and is well known to those skilled in this art.

Within said reactor I cause the stream 1 of precooled sea water to enter into contact with liquid propane principally from stream 6 and supplemented by additional liquid propane from stream 7. As discussed in U.S. Patent No. 2,974,102 a portion of said liquid propane vaporizes and thereby serves to absorb the heat required to effect the transformation of some of the water to propane hydrate. Approximately one pound of propane must be evaporated for each pound of water removed from the aqueous brine and converted to hydrate. Liquid propane equivalent to approximately 15% of said water which is transformed is required to form the hydrate in addition to that which is vaporized to absorb the heat of transformation.

The larger portion of the propane which enters reactor 3 is removed as vapor in stream 8 and enters as stream 9 to condenser 10 in which the propane vapor is condensed by the latent heat absorbing capacity of ice crystals which are carried in purified water in stream 11. Said stream 11 leaves condenser 10 as stream 12 which is pure water obtained from that of stream 11 and supplemented by the water obtained in melting of the ice. The water of stream 12 which is not removed as product water 5 is recycled as stream 13 to repulper 14 in which it is employed to produce the magma 11 with ice crystals, stream 15 from centrifuge 16.

Clathrate reactor 3 at a temperature of about 36° F. is caused to discharge the stream 17 which consists of a magma of propane hydrate in a brine which is concentrated by a factor of from 1.5 to 2 from the sea water. It is to be understood that the pressure within reactor 3 and in the shell of condenser 10 is that which corresponds approximately with the decomposition pressure of propane hydrate at the temperature and for the composition of the brine in reactor 3. This pressure must correspond also with the liquid-vapor equilibrium within condenser 10. The temperature at which the vapor pressure of the liquid propane and the decomposition pressure of propane hydrate are equal is termed the "critical temperature." It is a function of the brine concentration. Ideally the contents of reactor 3 should be very slightly below this critical temperature and the shell side of reactor 10 should be very slightly below said temperature.

I cause the magma stream 17 to be cooled from about 36° to about 26° F. by placing it in heat transfer relation with a liquid hydrocarbon stream 21 which contains about 70 mole percent of propane. Said heat transfer relationship is provided by the heat exchangers 18, 19 and 20. Heat absorbing capacity is that of the sensible heat absorbing capacity of the hydrocarbon stream 22 which leaves the centrifuge 16 at about 26° F. but also the latent heat absorbing capacity of the propane as it evaporates from the hydrocarbon solution. I cause the solution which is richest in propane content to encounter the coldest magma in exchanger 20 while the lean solution is in contact with the warmest magma in exchanger 18. Vapor 23 from all three exchangers 18, 19 and 20 are brought together and compressed in the primary compressor 24 to the pressure of vapor streams 8 and 9. The ratio of compression required of compressor 24 is about 3.5 and only about 15 percent of the propane which enters the clathrate reactor 3 needs to be compressed. The remaining 85 percent is caused to pass directly and without compression from clathrate reactor 3 to condenser 10. A small proportion, which may arise from stream 8 or 9, is sent in stream 25 to secondary compressor 26, and from there to condenser 27 which I cool with fresh sea water at the ambient temperature.

Liquid propane in stream 28 is at or above the temperature of this sea water. To avoid the return of this warm liquid I cool said liquid by self-evaporation in flash drum 29. The vapor stream 30 is recompressed while the liquid propane stream 7 is returned to reactor 3.

The ice reactor 32 is, as hereinbefore mentioned, maintained so that ice, propane hydrate, brine and vapor are substantially in equilibrium while said propane hydrate gradually dissolves with concurrent transfer of propane to a hydrocarbon solution and formation of ice crystals within the magma. The temperature at the triple point is very nearly that of the freezing point of the brine which should be approximately 26° F.

The stream 30 of hydrocarbon solution may be as high in temperature as 36° F. and it may be advisable to cool said stream prior to admitting it to reactor 32 by heat exchange in exchanger 21 with the hydrocarbon stream 22 which has been separated by centrifuge 16 from the magma from ice reactor 32.

The size of the ice crystals formed in reactor 32 is controlled by the rate of flow of the hydrocarbon stream 31, the flow rate of the magma stream 17, the rate of drive of compressor 24 and the back pressure of vapor stream 25 as this is affected by the drive rate of compressor 26.

Although in this embodiment propane is the hydrate-forming substance, any other hydrate-forming substance may be used within the scope of this invention. Further the term "hydrocarbon" is to be understood within the terms of reference to include all organic substances or liquid mixtures which will hold the hydrate-forming substance in solution.

A second embodiment of this invention is applicable to the case in which the hydrate-forming substance is such that the temperature of reaction of liquid hydrate-forming substance with the water of the brine is very considerably above 32° F., the temperature of the melting ice within condenser 10a. Examples of such substances are propane, methyl bromide, Freon 31 (monochloromonofluoromethane), difluoroethane, monochlorodifluoroethane. In this alternate embodiment I employ clathrate reactor to bring the precooled brine into intimate contact with a solution of the hydrate-forming substance in a suitable liquid. I maintain the concentration of said hydrate-forming substance so that the temperature at which said solution and said hydrate are in equilibrium is slightly higher than 32° F.

When the solution of said hydrate-forming substance leaving the clathrate reactor meets this requirement it may be employed to reabsorb the vapors leaving said clathrate reactor, heat of absorption of said vapor being transferred to melting ice. In this embodiment of my invention, condenser 10 of FIGURE 1 is omitted and in its place I substitute a vapor absorber 10a. Similarly I replace condenser 27 of FIGURE 1 with a water-cooled vapor absorber 27a.

FIGURE 2 illustrates a flow diagram setting forth the processing steps for demineralizing saline water in accordance with the beforementioned second embodiment of my invention. The numbered features correspond with those of FIGURE 1 except that 10a and 27a represent vapor scrubbers; also I substitute solution streams 6a and 7a in FIGURE 2 for FIGURES 1, 6 and 7, the correspondingly numbered liquid hydrate-former streams. Also FIGURE 2 includes liquid streams 34a and 35a to the vapor scrubbers.

A third embodiment of this invention is employed, as in the hereinbefore mentioned second embodiment, when the hydrate-brine-liquid hydrate-former equilibrium temperature is substantially higher than 32° F. In this third embodiment I add hydrate-former to the clathrate reactor as a component of a solution, another component of said solution being a liquid which is volatile and desirably more volatile than the hydrate-forming component and practically incapable of hydrate formation at the temperature, and under the conditions prevailing, within said clathrate reactor. This liquid incapable of hydrate formation under the conditions described and hereinafter referred to as a "non-hydrate-forming" substance or component and the hydrate component are desirably proportioned so that the latent heat absorbing capacity of the non-hydrate-forming substance is substantially equally to or greater than the heat generating capacity of the hydrate-forming component in its conversion to the hydrate.

As in the first embodiment as hereinbefore described the vapor which is produced concurrently with hydrate formation goes to a condenser. However in this third embodiment said vapor is enriched with respect to the non-hydrate-forming component (or components). The liquid which is obtained by condensation of said enriched vapor is suitable for use as a medium for conversion of the hydrate-containing magma to produce an ice-containing magma in the ice reactor.

The liquid mixture consisting of hydrate- and non-hydrate-forming components becomes enriched with respect to the former in its residence within the ice reactor. Upon leaving said ice reactor it is of a composition in which the components are in equilibrium with respect to the hydrate, ice, and brine at the invariant temperature which is, as hereinbefore noted, approximately the freezing point of said brine.

This third embodiment of this invention may be understood by reference to FIGURE 3. Sea water 1b is cooled to approximately hydrate reaction temperature by heat exchange means in precooler 2b in which the sensible heat of said sea water is absorbed by the waste brine 4b and product water 5b.

Clathrate reactor 3b receives the precooled sea water and stream 22b which consists of a liquid solution of the hydrate-forming substance and a diluent. In this third embodiment of this invention I select the hydrate-forming substance and the diluent, hereinafter termed the "refrigerant," so that the latter is preferably appreciably more volatile than the former. This is to insure that the vapor 9b and 25b is substantially enriched with respect to said refrigerant. I select the composition of the stream 22b so that the latent heat of vaporization to produce the stream 8b is equal to the heat of formation of hydrate contained in the magma stream 17b and the total sensible heat change of all components of said stream 17b.

In the operation of a process based on this embodiment I control the composition of the stream 22b so that the temperature of the stream 17b remains that for which hydrate and brine are preferably in equilibrium with a solution having the composition corresponding to stream 22b. This equilibrium temperature is determined readily by holding said brine, hydrate and solution within a closed container and observing the steady state temperature.

If the proportion of refrigerant is too high the temperature of the magma will pass below the equilibrium temperature due to enrichment of the solution phase in said refrigerant. Conversely if the proportion of hydrate-forming substance in stream 22b is too high the temperature along the stream in clathrate reactor 3b will rise.

I cause the magma stream 17b to be cooled to about 32° F. by precooling in precooler 2b and I control the rate and temperature at which the hydrate is formed in clathrate reactor 3b by control of the composition and rate of the liquid refrigerant and hydrate-former mixture 22b. I construct the clathrate reactor 3b preferably so that effective and prolonged contact is provided between said mixture and the sea water of stream 1b while providing means whereby the vapor 8b is released.

This vapor is compressed in compressor 24b prior to being condensed in condenser 10b in which said vapor compressed is brought into direct contact with ice and water of stream 11b. Vapor which is not condensed in 10b is compressed further in compressor 26b and said vapor compressed is then condensed in condenser 27b which is cooled by sea water either indirectly as shown in FIGURE 3 or by direct contact of the coolant with said refrigerant vapor compressed. The condensates 6b and 28b are then combined to enter the ice reactor 32b following heat exchange with cold waste brine in exchanger 21b.

As hereinbefore described I convert the magma 17b from one in which the solid phase is a hydrate to one in which ice crystals of controlled size are in suspension within a heterogeneous mixture of brine and a solution of hydrate-forming substance and refrigerant.

Other features of this third embodiment of this invention are similar to those other embodiments hereinbefore described and those numbers which designate the operations and process of said third embodiment streams as illustrated in FIGURE 3 are similar to those of FIGURES 1 and 2 as designated by number references which are the same except for the letter suffix.

The third embodiment of my process for demineralizing sea water is illustrated by reference to the following example of operating data read in conjunction with the accompanying drawing. 25,875 pounds per hour of sea water having a salt content of 3.38 percent and at a temperature of 85° F. is passed through precooler 2b wherein it is cooled to about 30° F. The precooled sea water is then introduced into clathrate reactor 3b and is therein brought into contact with solution stream 22b consisting of 27 percent of F–21 (dichlorofluoromethane) and 73 percent of propylene under a pressure of 65 p.s.i.a. and flowing at a rate of 10,533 pounds per hour.

The mixed streams react in the course of their residence within the reactor 3b. Magma stream 17b leaving reactor 3b is at a pressure of 58 p.s.i.a. and a temperature of 26° F. Said stream consists of 11,333 pounds per hour of hydrate crystals and 14,542 pounds per hour of brine. This stream is pumped to ice reactor 32b under pressure of 70 p.s.i.a. and therein is caused to react with liquid propylene in the amount of 7700 pounds from streams 6b and 28b after precooling said propylene in heat exchanger 21b.

Reaction is thereby caused to occur within reactor 32b at a temperature of about 26° F. whereby the hydrate crystals in entering stream 17b are converted to 8330 pounds of ice within a liquid mixture consisting of 17,545 pounds of brine and 10,533 pounds of solution heretofore described as stream 22b.

The three component phases of the magma leaving ice reactor 32b are separated by centrifuge means 16b to obtain 8330 pounds of ice, 15b to be melted to purified product water, solution 22b for recycle and waste brine 4b to be discharged after heat exchange in 21b and 2b.

Ice is carried in a stream 11b obtained by repulping said ice with recycle water stream 13b at the rate of about 20,000 pounds per hour. Stream 11b enters into direct contact with vapor stream 9b obtained by compression of vapor 8b from 58 to 75 p.s.i.a. in compressor 24b. Approximately 89 percent of the vapor from clathrate reactor 32b is condensed. The remainder is compressed to 215 p.s.i.a. in compressor 26b and then condensed in 27b for recycle.

Water stream 12b leaving condenser 10b is split, with 1000 gallons per hour as product water 5b and the remainder going to recycle as hereinabove described.

*Example II*

Another example illustrates the use of a hydrocarbon, e.g., gasoline, to cause the transformation of hydrate crystals into ice.

25,875 pounds per hour of sea water at the temperature and salt concentration as in Example I is precooled to about 52° F. by heat exchange. 24,800 pounds per hour of methyl bromide at the same temperature is caused to react with this water. A part of the methyl bromide, equal to 17,500 pounds per hour, evaporates under a pressure of 19.3 p.s.i.a. to convert 11,250 pounds of water to 18,750 pounds of the hydrate of methyl bromide.

The magma containing said hydrate in the now-concentrated brine is then treated with a hydrocarbon such as gasoline in the amount of 21,000 pounds per hour within an ice reactor. The gasoline containing 3,000 pounds per hour of methyl bromide as it enters the reactor at about 26° F. is brought into contact with the magma after said magma has been reduced in temperature to the freezing temperature of 26° F. as described below.

As a result of the contact between the gasoline stream and the magma 7500 pounds per hour of methyl bromide is removed from the hydrate and dissolved in said gasoline stream which now contains 10,500 pounds of methyl bromide dissolved in 21,000 pounds of gasoline. This stream after being separated from the ice and brine, e.g., by a centrifuge, is brought into counter current flow relation with the magma of hydrate in brine so that an additional 2777 pounds per hour of methyl chloride is extracted yielding a solution containing 13,277 pounds per hour of methyl bromide and 21,000 pounds per hour of gasoline.

This extraction results in the dissolving of 6,950 pounds per hour of hydrate thereby cooling the magma from 54° F. to 26° F. The cooled magma is then treated with the fresh gasoline as described above to convert within the ice reactor the hydrate crystals to ice.

The solution of methyl bromide in gasoline is then partially separated into its component fractions by evaporative distillation to yield methyl bromide in an overhead and with a bottom product fraction having the composition which is required for the solution entering the ice reactor as described above.

I condense at least 90 percent of the 17,300 pounds per hour of methyl bromide vapor in the primary condenser by employing the latent heat-absorbing capacity of 8,330 pounds of ice melting to produce water; the sensible heat-absorbing capacity of said water while it is being heated from 32 to 48° F.; and the sensible heat-absorbing capacity of 17,545 pounds of waste brine while being heated from 26 to 48° F.

I compress the remainder of not more than 10 percent, or 1,730 pounds per hour, of methyl bromide vapor from 19.3 to about 35 p.s.i.a. and condense the said compressed vapor while transferring its latent and sensible heat to a stream of sea water.

The required brake horsepower is about 7 H.P. Most of the energy for the process illustrated by this example is that of evaporation of 17,300 pounds per hour of methyl bromide, about 1,600,000 B.t.u. per hour when said evaporation is performed in a single effect and with suitable heat exchange means to preheat the entering stream. However I prefer to recover the methyl bromide and gasoline streams by multiple effect evaporation as it is well known that by this means the energy consumption may be greatly reduced.

From the preferred forms of my invention which I have heretobefore shown and described it may be seen that various combinations are possible whereby a hydrate may be formed within a magma and thereafter transformed to yield ice crystals, said ice crystals then being separated from the concentrated solution. It may be seen further that various combinations are possible whereby the latent and sensible heat-absorbing capacities of the product streams may be used and also whereby the hydrate former and/or refrigerant streams may be restored in a process. I am aware that variations may be made within the scope of the disclosure herein and the following claims.

In the following claims, by "clathrate-forming" substance is meant a substance capable of forming a clathrate with water.

I claim:

1. A method of extracting water in the form of ice crystals from a given aqueous solution, comprising
   (A) forming a first magma (I), containing, (1) a clathrate of a portion of the water from said given aqueous solution and also containing, (2) the resulting aqueous solution in a more concentrated form than the given aqueous solution, then
   (B) dispersing through said first magma (I) an organic liquid substance, which is largely water immiscible and capable of dissolving the non-aqueous component of said clathrate, under temperature and pressure conditions to form thereby a second magma (II), containing, (1) ice crystals resulting from water in the first magma (I), and containing also, (2) the resulting aqueous solution in a more concentrated form than in said given aqueous solution, and (3) the resulting solution of the non-aqueous component of said clathrate in said organic liquid substance, and
   (C) separating the ice crystals from the rest of the latter magma (II).

2. A method of extracting water in the form of ice crystals from a given aqueous solution, comprising
   (A) forming at or near the freezing point of said given aqueous solution a first magma (I) containing, (1) a clathrate of a portion of the water from said given aqueous solution, and also containing, (2) the resulting aqueous solution in a more concentrated form than the given aqueous solution, then
   (B) dispersing through said first magma (I) while at said freezing temperature by agitation an organic liquid substance, which is largely water-immiscible and capable of dissolving the non-aqueous component of said clathrate to produce thereby a second four phase magma (II), consisting essentially of (1) ice crystals resulting from the water in the first magma (I), and also (2) the resulting aqueous solution in a more concentrated form than in said given aqueous solution, and (3) the resulting solution of the non-aqueous component of said clathrate in said organic liquid substance, and
   (C) separating the ice crystals from the rest of the latter magma (II).

3. A method according to claim 1, wherein said organic water-immiscible substance is of the class consisting of gasoline, n-butane, butene-1, butadiene and monochlorotrifluoroethylene.

4. A method according to claim 1, wherein said given aqueous solution is brine.

5. A method according to claim 1, wherein the non-aqueous component of the clathrate is of the class consisting of propane, methyl bromide, monochloromonofluoromethane, monochlorodifluoroethane, dichloromonofluoromethane and difluoroethane.

6. A method of extracting water from a given saline water, comprising the steps of
   (A) contacting said given saline water with a substance in liquid form containing a volatile component, said substance also containing a component capable of forming a clathrate with a portion of the water from said given saline water, said contacting step being carried out under temperature and pressure conditions to evaporate at least a part of said volatile component to produce thereby a first magma (I) containing, (1) a clathrate of a portion of the water from said given saline water, and (2) the resulting saline water in a more concentrated form than said given saline water,
   (B) dispersing through said first magma (I) an organic liquid substance which is largely water-immiscible and capable of dissolving the non-aqueous component of said clathrate under temperature and pressure conditions to produce a second magma (II) containing ice crystals resulting from the water in said magma (I),
   (C) separating the ice crystals from the latter magma (II), and
   (D) melting the ice crystals by passing the ice crystals and the vapor produced by evaporation of said volatile component in heat exchange relationship.

7. A method of extracting water from a given saline water, comprising the steps of
   (A) contacting said given saline water with a substance capable of forming a clathrate with a portion of the water from said given saline water, said contacting step being carried out under temperature and pressure conditons to evaporate a part of said clathrate-forming substance and to produce thereby a first magma (I) containing, (1) a clathrate of a portion of the water from said given saline water, and (2) the resulting saline water in a more concentrated form than said given saline water,
   (B) dispersing through said first magma (I) an organic liquid substance which is largely water-immiscible and capable of dissolving the non-aqueous component of said clathrate-forming substance under temperature and pressure conditions to produce a second magma (II) containing ice crystals,
   (C) separating the ice crystals from the second magma (II),
   (D) liquifying the evaporated clathrate-forming substance, and
   (E) returning the liquified clathrate-forming substance into contact with said given saline water for recycling in said contacting step.

8. The method of claim 7, wherein the saline water contained in said second magma (II) and the organic liquid substance are separated from each other and from the ice crystals, and the separated organic liquid substance is recycled back into dispersion through the first magma (I) to carry out said dispersing step.

9. The method as described in claim 1, wherein said first magma (I) is formed by contacting said given aqueous solution with a substance in liquid form containing, (1) a volatile component not capable of forming a clathrate with a portion of the water from said given aqueous solution, and (2) a component capable of forming a clathrate with a portion of the water from said given solution, said contacting step being carried out under temperature and pressure conditions to evaporate at least a part of said volatile component to produce thereby said first magma (I).

10. A method as described in claim 9, wherein said volatile non-clathrate-forming component is more volatile than the clathrate-forming component.

11. A method of extracting water in the form of ice crystals from a given aqueous solution, comprising the steps of
    (A) contacting said given aqueous solution with a substance in liquid form containing, (1) a component capable of forming a clathrate of a portion of the water from said given aqueous solution, and (2) a volatile organic water-immiscible component not capable of forming a clathrate of a portion of the water from said given aqueous solution and more volatile than said clathrate-forming component, said non-clathrate-forming component being capable of dissolving said clathrate-forming component, said contacting step being carried out under temperature and pressure conditions to evaporate at least a substantial part of said volatile component to produce thereby a first magma (I) comprising, (1) a clathrate of a portion of the water from said given aqueous solution, and (2) the resulting aqueous solution in a more concentrated form than said given aqueous solution,
    (B) liquifying the evaporated non-clathrate-forming component,
    (C) dispersing said liquified non-clathrate-forming component through said first magma (I) under temperature and pressure conditions to form thereby a second magma (II) comprising, (1) ice crystals resulting from the water as in said magma (I), and also (2) the resulting aqeuous solution in a more concentrated form than in said given aqueous solution, and (3) said liquified non-clathrate-forming component, and
    (D) separating the ice crystals from the second magma (II).

12. A method as described in claim 1, wherein said first magma (I) is formed by contacting said given aqueous solution with a substance in liquid form comprising, (1) a component capable of forming a clathrate with a portion of the water from said given aqueous solution, and (2) a volatile component not capable of forming a clathrate with a portion of the water from said given aqueous solution and more volatile than said clathrate-forming component, said contacting step being carried out under temperature and pressure conditions to evaporate at least a substantial part of said volatile component to produce thereby said first magma (I), said volatile non-clathrate-forming component and said clathrate-forming component in said contacting step being proportioned so that the latent heat absorbing capacity of said volatile non-clathrate-forming component is at least substantially equal to the heat generating capacity of said clathrate-forming component in its conversion to the clathrate in said first magma (I).

References Cited by the Examiner

FOREIGN PATENTS 217,766  10/58  Australia.

OTHER REFERENCES

Saline Water Conversion by Freezing with Hydrocarbons, Chemical Engineering Progress, vol. 57, No. 1, January 1961, pp. 42–51.

MORRIS O. WOLK, *Primary Examiner.*